Dec. 28, 1937.  H. C. HITT  2,103,259

EPICYCLIC GEAR TRAIN

Filed Jan. 15, 1936

Inventor:
Henry C. Hitt
by Robert A. Lavender
Attorney

Patented Dec. 28, 1937

2,103,259

UNITED STATES PATENT OFFICE 2,103,259

EPICYCLIC GEAR TRAIN

Henry C. Hitt, Bremerton, Wash.

Application January 15, 1936, Serial No. 59,229

5 Claims. (Cl. 74—282)

(Granted under the act of March 3, 1883, as amended April 30, 1928; 370 O. G. 757)

This invention relates to an epicyclic gear train of a type commonly called a differential gear and more particularly to a gear train wherein provision is made to eliminate backlash between the meshed gear members.

It is among the objects of this invention to provide a gear train of the kind specified that will be simpler than those heretofore used for like purposes and that will effectively eliminate backlash at every place in the train where two gears are meshed.

Figure 1:
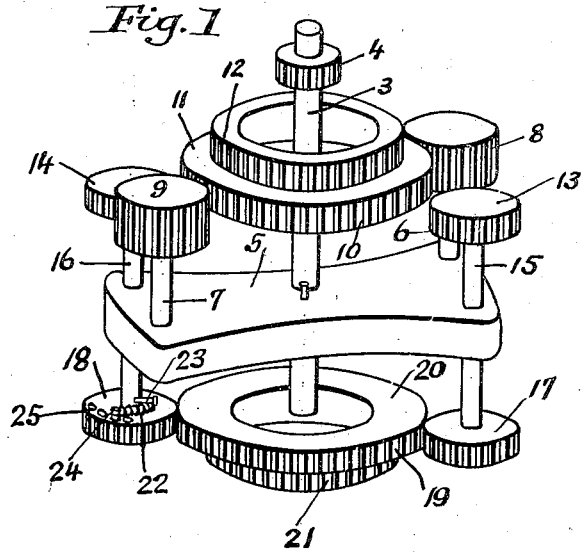
Fig. 1 illustrates schematically the principle of operation of my invention, shown thus for the purpose of more clearly pointing out the distinctive features of my invention.

In Fig. 1 the input shaft 3 carries a gear 4 by which the shaft may be rotated and has a driving connection with arm member 5 mounted thereon. Rotatably mounted on shafts 6 and 7 secured to arm member 5 are intermediate planet gears 8 and 9 meshed with the gear 10 on input member 11, which member also has a series of teeth 12 forming an input gear. Intermediate gears 8 and 9 are meshed with gears 13 and 14, respectively, which are fixed on shafts 15 and 16 journalled in arm member 5 and having at their other ends gears 17 and 18 engaging gear teeth 19 on output member 20, which carries also the output gear teeth 21. The shaft 16 has a limited freedom of rotation with respect to gear 18 and is connected to that gear by a spring 22 having one end attached to pin 23 fixed in shaft 16 and the other end attached to a pin 24 seated in a hole 25 in gear 18, there being a plurality of such holes to permit of adjusting the tension of spring 22.

If shaft 3 is rotated while input member 11 is held stationary the intermediate planet gears 8 and 9 will be carried around by arm member 5 and will be rotated through engagement of their teeth with those of gear 10, which rotation will be imparted to planet gears 13 and 14 and thence by shafts 15 and 16 to gears 17 and 18 and output member 20. When input member 11 is rotated while shaft 3 is held stationary the intermediate gears 8 and 9 are caused to rotate on their shafts and thus through the gears 13 and 14, shafts 15 and 16, and gears 17 and 18 the output member 20 is driven. If both shaft 3 and input member 11 are rotated simultaneously the angular movement of output member 20 will be the algebraic sum of the angular movements of the shaft 3 and of input member 11 modified, of course, by any ratios in the planet gears that vary from unity. The tendency of spring 22 is to rotate shaft 16 and gear 18 in opposite directions and thus to take up back-lash between all the several gears of the train.

Figure 2:
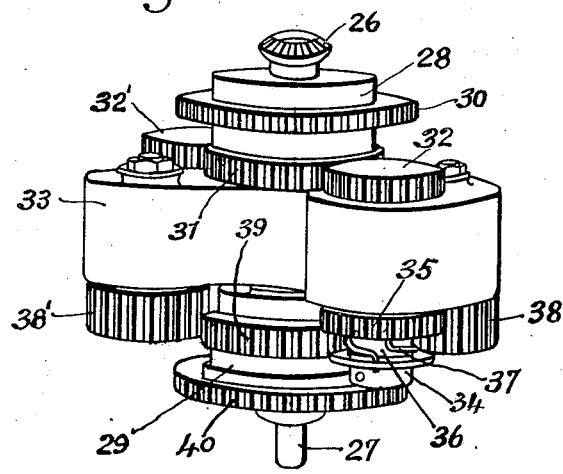
Fig. 2 is a side elevational view of a gear train embodying my invention.

In Fig. 2 the gear 26 is fixed on input shaft 27, input member 28 and output member 29 being freely rotatable on input shaft 27. Input member 28 has input gear teeth 30, and gear teeth 31 meshed with gears 32 and 32' each mounted on a shaft that extends through arm member 33 which has a driving connection with input shaft 27. Upon the other end of the shaft to which gear 32 is fixed is keyed a collar 34 and between this collar and the arm member 33 is a gear 35 that is rotatable on the shaft of the gear 32. Gear 35 has an elongated hub 36 and around this hub, substantially in the form of an annulus, is disposed a resilient element 37 having one end fixed to gear 35 and the other end secured to collar 34, the stress in the element 37 being such that it tends to rotate gear 35 and gear 32 in opposite directions. The gear 32' being rigidly connected to a gear corresponding to 35. Planet gears 38 and 38' are rotatably mounted on arm member 33 and are meshed with the two gears 35 and gear 39 on output member 29 which carries also the output gear 40.

When shaft 27 is driven while input member 28 is held stationary the gears 32 are caused to travel around gear 31 and so, through gears 35, the planet gear 38 is caused to rotate and drive output member 29. If shaft 27 be held against rotation while input member 28 is driven, the output member 29 will be driven through gears 32, 35, 38 and 39. It is obvious that with my present invention there will be no place where two gears are in mesh from which the backlash will not be eliminated by action of spring 37, since the gear 32 acts directly upon gear 31 on input member 28 and thence through gear 32', the gear 35 connected thereto, gears 38', 39 and so back to 35 and spring 37.

It is thus apparent that the direct action of anti-backlash spring 37 upon all the transmitting elements of my gear train effectively holds the teeth of the several gears continuously in operative contact.

The invention described herein may be manufactured and used by or for the Government of the United States of America for governmental purposes without the payment of any royalties thereon.

I claim:

1. An epicyclic gear train, comprising an input shaft, an arm member fixed thereto to rotate therewith having portions extending radially outwardly in opposite directions therefrom, a planet gear rotatably mounted on said member adjacent each end thereof, both said planet gears being on the same side of said member, a member rotatably mounted on said shaft having a gear for outside connections and a gear meshed with said planet gears, a gear on the one face of one end of said arm member having a shaft extending through said arm member, a gear rotatable on the other end of said gear shaft, a resilient element substantially in the form of an annulus around the hub of the last mentioned gear having one end fixed to said last mentioned gear and the other end fixed to said gear shaft, said element being under stress tending to rotate in opposite directions the gear and the shaft on which it is mounted, a shaft extending through the other end of said arm member, a gear fixed on each end of the last mentioned shaft with one thereof meshed with a planet gear, and a member rotatable on the input shaft having a gear for outside connection and a gear meshed with one gear on each of the shafts through the ends of said arm member.

2. An epicyclic gear train, comprising an input shaft, an arm member fixed thereto having portions extending radially outwardly in opposite directions, a planet gear rotatably mounted on said member adjacent each end thereof and both on the same side of said member, an output member rotatable on said shaft having an output gear and a gear meshed with both said planet gears, a gear rotatably mounted on the other side of said member having a shaft extending through said member, a gear rotatably mounted on said gear shaft and meshed with one of said planet gears, means connecting said last mentioned gear and said gear shaft tending to rotate in opposite directions the last mentioned gear and the shaft upon which it is mounted, and an input member rotatable on said input shaft having an input gear and a gear meshed with the gear on the said other side of the arm member.

3. An epicyclic gear train, comprising an input shaft, planet gears operatively connected to said shaft on opposite sides thereof to rotate therewith, output means driven by said planet gears, input means other than said input shaft, and a driving connection between said input means and one of said planet gears consisting of two coaxial gears at different positions in said train rotatable with respect to each other and a resilient element operatively connected to both of said two gears to rotate said gears in opposite directions said planet gears and the gears meshed therewith constituting a closed, mutually interacting system wherein said driving connection is effective to eliminate backlash between any two gears in mesh with each other.

4. An epicyclic gear train, comprising an input shaft, planet gears operatively connected to said shaft on opposite sides thereof to rotate therewith, output means driven by said planet gears, input means other than said input shaft, and a driving connection between said input means and one only of said planet gears consisting solely of two coaxial gears at different positions in said train rotatable with respect to each other and a resilient element operatively connected to both of said two gears to rotate said gears in opposite directions said planet gears and the gears meshed therewith constituting a closed, mutually interacting system wherein said driving connection is effective to eliminate backlash between any two gears in mesh with each other.

5. An epicyclic gear train, comprising an input shaft, planet gears operatively connected to said shaft on opposite sides thereof to rotate therewith, output means driven by said planet gears, input means other than said input shaft, and a driving connection between said input means and one of said planet gears consisting of two coaxial gears at different positions in said train rotatable with respect to each other and a driving connection between said two gears continuously tending to rotate said gears in opposite directions said planet gears and the gears meshed therewith constituting a closed, mutually interacting system wherein said driving connection is effective to eliminate backlash between any two gears in mesh with each other.

HENRY C. HITT.